United States Patent [19]
Smith

[11] Patent Number: 5,617,339
[45] Date of Patent: Apr. 1, 1997

[54] METHOD AND APPARATUS FOR DETECTING DEGRADATION IN DATA STORAGE SYSTEM SPINDLE MOTOR PERFORMANCE

[75] Inventor: Gordon J. Smith, Rochester, Minn.

[73] Assignee: International Business Machines Corpoation, Armonk, N.Y.

[21] Appl. No.: 348,470

[22] Filed: Dec. 2, 1994

[51] Int. Cl.⁶ .................................................. G11B 27/36
[52] U.S. Cl. ...................... 364/569; 364/186; 369/53
[58] Field of Search ................................ 364/550, 569, 364/185, 186, 551.01, 565, 580; 360/69, 75; 369/53; 318/268

[56] References Cited

U.S. PATENT DOCUMENTS

| | | | |
|---|---|---|---|
| 3,787,670 | 1/1974 | Nelson et al. | 395/183.2 |
| 4,692,832 | 9/1987 | Bandara et al. | 360/137 |
| 4,755,889 | 7/1988 | Schwartz | 360/32 |
| 4,979,055 | 12/1990 | Squires et al. | |
| 5,115,225 | 5/1992 | Dao et al. | 340/584 |
| 5,157,666 | 10/1992 | Chen et al. | |
| 5,287,363 | 2/1994 | Wolf et al. | 371/21.1 |
| 5,289,097 | 2/1994 | Erickson et al. | 318/561 |
| 5,349,276 | 9/1994 | Mezzatesta, Jr. et al. | 318/268 |
| 5,412,519 | 5/1995 | Buettner et al. | 360/73.03 |
| 5,453,972 | 9/1995 | Kanazawa et al. | 369/219 |

FOREIGN PATENT DOCUMENTS 4153949  5/1992  Japan .

*Primary Examiner*—Emanuel T. Voeltz
*Assistant Examiner*—Edward Pipala
*Attorney, Agent, or Firm*—Merchant, Gould, Smith, Edell, Welter & Schmidt, P.A.

[57] ABSTRACT

A method and apparatus for detecting degradation in data storage system spindle motor performance is disclosed. A duration of time required for the spindle motor to transition between an initial velocity and a test velocity is determined at or near the time of data storage system manufacture and periodically during the service life of the spindle motor. Deviations between the manufacturing and in-service time durations are computed and, depending on the magnitude of the deviation, invoke particular data storage system responses. The in-service time duration procedure is preferably performed when spindle motor power is removed, typically during a power-down or power-saving sequence.

20 Claims, 7 Drawing Sheets

COAST DOWN TIME

SPIN-UP TIME

FIG. I

METHOD AND APPARATUS FOR DETECTING DEGRADATION IN DATA STORAGE SYSTEM SPINDLE MOTOR PERFORMANCE

FIELD OF THE INVENTION

The present invention relates generally to data storage systems, and, more particularly, to a method and apparatus for detecting degradation in spindle motor performance.

BACKGROUND OF THE INVENTION

A typical data storage system includes one or more data storage disks coaxially mounted on a hub of a spindle motor. The spindle motor rotates the disks at speeds typically on the order of several thousand revolutions-per-minute. Digital information, representing various types of data, is typically written to and read from the data storage disks by one or more transducers, or read/write heads, which are mounted to an actuator and passed over the surface of the rapidly rotating disks.

The actuator typically includes a plurality of outwardly extending arms with one or more transducers being mounted resiliently or rigidly on the extreme end of the arms. The actuator arms are interleaved into and out of the stack of rotating disks, typically by means of a coil assembly mounted to the actuator. The coil assembly generally interacts with a permanent magnet structure, and the application of current to the coil in one polarity causes the actuator arms and transducers to shift in one direction, while current of the opposite polarity shifts the actuator arms and transducers in an opposite direction.

In a typical digital data storage system, digital data is stored in the form of magnetic transitions on a series of concentric, closely spaced tracks comprising the surface of the magnetizable rigid data storage disks. The tracks are generally divided into a plurality of sectors, with each sector comprising a number of information fields. One of the information fields is typically designated for storing data, while other fields contain sector identification and synchronization information, for example. Data is transferred to, and retrieved from, specified track and sector locations by the transducers being shifted from track to track, typically under the control of a controller. The transducer assembly typically includes a read element and a write element. Other transducer assembly configurations incorporate a single transducer element used to write data to the disks and read data from the disks.

Writing data to a data storage disk generally involves passing a current through the write element of the transducer assembly to produce magnetic lines of flux which magnetize a specific location of the disk surface. Reading data from a specified disk location is typically accomplished by a read element of the transducer assembly sensing the magnetic field or flux lines emanating from the magnetized locations of the disk. As the read element passes over the rotating disk surface, the interaction between the read element and the magnetized locations on the disk surface results in the production of electrical pulses in the read element. The electrical pulses correspond to transitions in the magnetic field.

It is recognized by those skilled in the art that the performance of the spindle motor is critical to providing a high level of data storage system performance and reliability. Normal and accelerated wearing of the spindle motor assembly and, in particular, the spindle bearings, have been associated with a general degradation in data storage system performance. Irregularities in the precision machined surfaces of the spindle motor bearings and deformations in the bearing race, for example, typically result in increased friction within the spindle bearing assembly and accelerated bearing assembly fatigue. Such undesirable changes in the spindle bearing assembly operating condition generally lead to a progressive degradation in spindle motor performance, increased consumption of spindle motor supply current to overcome additional mechanical friction, and, more significantly, a higher probability of temporary or permanent loss of data stored on one or more data storage disks mounted to the hub of the spindle motor.

It is generally considered desirable to detect changes in the performance of the spindle motor early in, and throughout, its service life in order to minimize the probability of intermittent and catastrophic failure of the data storage system. A number of elaborate and typically expensive predictive failure analysis methodologies have been developed in an attempt to detect the existence of failure modes associated with spindle motor bearing assembly deterioration. Many of these prior art methodologies require that the data channel or servo channel be active in order to perform various test routines and to acquire data that, when analyzed, only indirectly indicates the existence or non-existence of a spindle motor failure mechanism.

Additional electronic hardware and control circuitry is often installed into a data storage system in order to support these and other known predictive failure analysis schemes, thus adding to the overall cost and complexity of the system. In small and very small form factor data storage systems, which, in general, are particularly susceptible to spindle bearing fatigue, the relatively compact packaging configuration of such miniaturized systems often preclude employment of a predictive failure analysis scheme that requires installation of additional system components. Moreover, it is believed that none of the conventional spindle motor predictive failure analysis methodologies are capable of detecting the existence of internal data storage system failure modes that adversely affect spindle motor performance yet are not attributable to spindle bearing deterioration or wearout.

There exists in the data storage system manufacturing industry a keenly felt need to provide a spindle motor predictive failure analysis tool that detects degradation in spindle motor performance during the service life of the spindle motor. There exists a further need to provide such a detection tool that requires little or no alteration of the existing configuration of a data storage system, and that minimally impacts the standard operation of the system. The present invention fulfills these and other needs.

SUMMARY OF THE INVENTION

The present invention is a method and apparatus for detecting degradation in data storage system spindle motor performance. A duration of time required for the spindle motor to transition between an initial velocity and a test velocity is determined at or near the time of data storage system manufacture and periodically during the service life of the spindle motor. Deviations between the manufacturing and in-service time durations are computed and, depending on the magnitude of the deviation, invoke particular data storage system responses. The in-service time duration determination procedure is preferably performed when spindle motor power is removed, typically during a normal power-down or power-saving sequence.

DETAILED DESCRIPTION OF THE PREFERRED EMBODIMENTS

Figure 1:
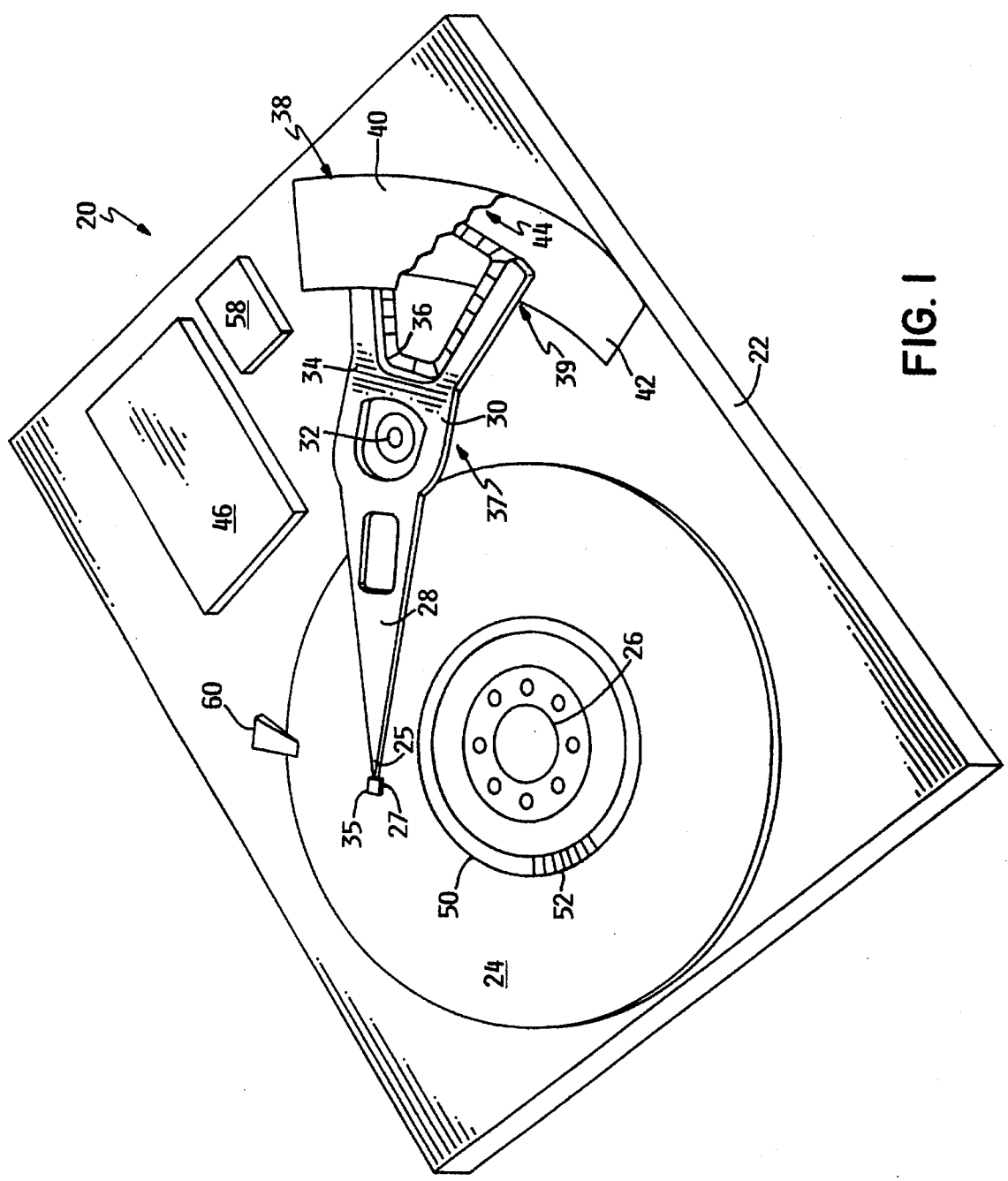
FIG. 1 is a top perspective view of a data storage system with its upper housing cover removed.
Figure 2:
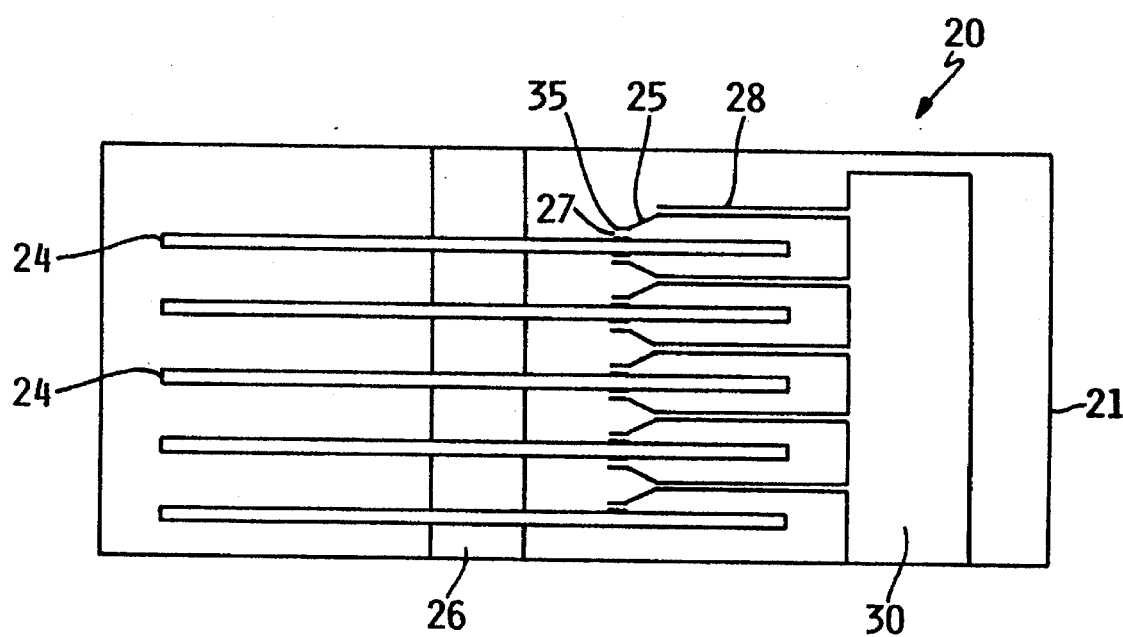
FIG. 2 is a side plan view of a data storage system comprising a plurality of data storage disks.

Referring now to the drawings, and more particularly to FIGS. 1 and 2, there is shown a data storage system 20 with the cover removed from the base 22 of the housing 21. The data storage system 20 typically includes one or more rigid data storage disks 24 which are stacked coaxially in a tandem spaced relationship, and rotate about a spindle motor 26 at a relatively high rate of rotation. Each disk 24 is typically formatted to include a plurality of spaced concentric tracks 50, with each track being partitioned into a series of sectors 52 which, in turn, are further divided into individual information fields. One or more of the disks 24 may alternatively be formatted to include a spiralled track configuration.

An actuator 30 typically includes a plurality of interleaved actuator arms 28, with each arm having one or more transducer 27 and slider body 35 assemblies mounted to a load beam 25 for reading and writing information to and from the data storage disks 24. The slider body 35 is typically designed as an aerodynamic lifting body that lifts the transducer 27 off of the surface of the disk 24 as the rate of spindle motor 26 rotation increases, and causes the transducer 27 to hover above the disk 24 on an air layer produced by airflow patterns produced by high-speed disk rotation. A conformal lubricant may alternatively be disposed on the disk surface 24 to reduce static and dynamic friction between the slider body 35 and disk surface 24.

The actuator 30 is usually mounted to a stationary actuator shaft 32, and rotates on the shaft to move the actuator arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38, causing the actuator arms 28, in turn, to sweep over the surface of the data storage disks 24. The spindle motor 26 typically comprises a polyphase, a.c. motor or, alternatively, a d.c. motor, energized by a power supply 46 and adapted for rotating the data storage disks 24.

The coil assembly 36 and the upper and lower magnet assemblies 40 and 42 of the permanent magnet structure 38 operate in cooperation as an actuator voice coil motor 39 responsive to control signals produced by a controller 58. The actuator voice coil motor 39 produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34, in turn, cause corresponding rotational movement of the actuator arms 28 in directions dependent on the polarity of the control currents flowing in the coil assembly 36. A controller 58 preferably includes control circuity that coordinates the transfer of data to and from the data storage disks 24, and cooperates with the actuator voice coil motor 39 to move the actuator arms 28 and transducers 27 to prescribed track 50 and sector 52 locations when reading and writing data to and from the disks 24.

It is well understood that optimum spindle motor 26 operation is essential for maintaining a high level of data storage system 20 performance and reliability. Degradation in spindle motor 26 performance is often attributed to mechanical fatigue in the bearing assembly of the spindle motor 26. Irregularities in the configuration of the bearings or bearing cartridge, for example, can impede the movement of the bearings as the spindle motor 26 rotates at speeds typically on the order of 5,000 to 7,000 revolutions-per-minute. Fabrication and assembly defects associated with the manufacture of individual precision bearings, the bearing cartridge, and the spindle motor assembly often contribute to a significant reduction in the service life of the spindle motor 26.

The novel spindle motor predictive failure analysis method and apparatus provides for early detection of subtle and pronounced changes in the spindle bearing condition which, if undetected, can lead to progressive degradation and accelerated failure of the spindle motor assembly 26. Natural spindle bearing assembly wearout is also detected by periodic execution of the novel spindle motor degradation detection method during the service life of the spindle motor. The novel predictive failure analysis method further detects the existence of data storage system 20 failure modes that affect spindle motor 26 performance yet are not directly associated with spindle bearing damage and wearout.

In one embodiment, the novel predictive failure analysis method and apparatus for assessing the operating condition of the spindle motor 26 is preferably employed to determine the coastdown time of the spindle motor 26 at the time of manufacture and at various times throughout the service life of the spindle motor 26. Coastdown time (CDT) of the spindle motor 26, as discussed herein, refers to a duration of time required for the spindle motor to transition between an initial angular velocity ($\omega_I$) and a test angular velocity ($\omega_T$).

In practice, the initial angular velocity $\omega_I$ is preferably selected as the nominal design velocity ($\omega_N$) of the spindle motor 26, and the test angular velocity $\omega_T$ is preferably selected as a relatively slow velocity with respect to the initial velocity $\omega_I$. It has been determined that a decrease in the in-service coastdown time of a particular spindle motor 26 is generally indicative of a failure mechanism which leads to progressive and accelerated degradation in spindle motor 26 performance. One common failure mechanism, as previously discussed, is associated with an increase in mechanical friction within the bearing assembly.

Figure 3:
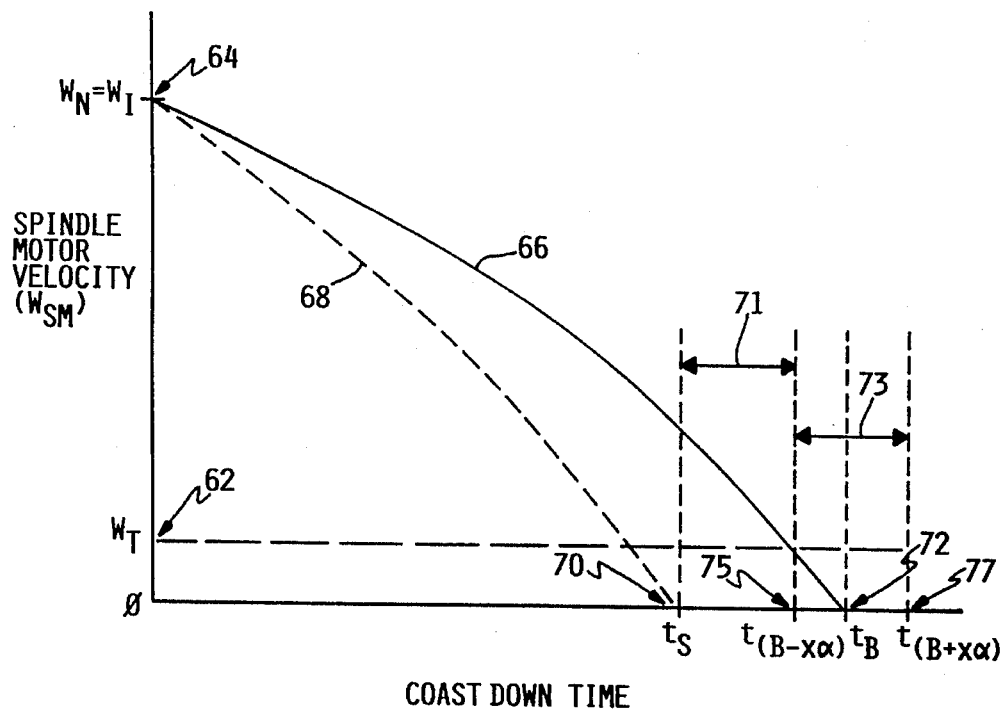
FIG. 3 is a generalized graph depicting typical coastdown time curves for a spindle motor operating under nominal conditions and degraded conditions.

Referring now to FIG. 3, there is shown a generalized graph depicting the characteristic coastdown time curves 66 and 68 for a particular spindle motor 26 respectively determined at or near the time of data storage system 20 manufacture and at a later time during the service life of the spindle motor 26. The coastdown time curve 66 is generally depictive of the natural deceleration of the spindle motor 26, after power is removed, plotted as a function of spindle motor velocity ($\omega_{SM}$) and time (t). At the time of data storage system 20 manufacture, and preferably after the system 20 has passed final acceptance testing, the characteristic coastdown time of the spindle motor is determined. The spindle bearing friction, which will affect the deceleration and acceleration time, is strongly temperature dependant. Thus, the characteristic coastdown time of a spindle motor 26 should be determined with the data storage system maintained at normal operating temperature. After the spindle motor 26 attains its nominal design speed $\omega_N$ 64, and after the data storage system 20 reaches a steady-state operating temperature, the power supplied to the spindle motor 26 is removed or otherwise disabled. Preferably, the spindle motor 26 then decelerates unaffected by a breaking mechanism or other apparatus that might otherwise increase the rate of spindle motor 26 deceleration.

The duration of time required for the spindle motor 26 to decelerate from the initial speed $\omega_N$ 64 to the spindle motor 26 test velocity $\omega_T$ 62 is then determined. This time duration, indicated as $t_B$ 72 in FIG. 3, is the characteristic coastdown time of the spindle motor 26 at the time of manufacture of the data storage system 26 which is later referenced as a benchmark for detecting changes in spindle motor 26 performance. It is noted that the procedure for establishing the benchmark coastdown time $t_B$ of the spindle motor 26 at the time of manufacture may be repeated a number of times in order to obtain an average benchmark coastdown time $t_B$ 72. It is further noted that the spindle motor 26 test velocity $\omega_T$ 62 is preferably selected to be relatively slow in comparison to the initial velocity $\omega_N$ 64 in order to increase the accuracy of the novel predictive failure analysis procedure.

With further reference to FIG. 3, the coastdown time curve 68 is generally representative of the deceleration characteristics of the spindle motor 26 at a point in time during the service life of the spindle motor 26. An in-service coastdown time for the spindle motor 26 is illustrated as $t_S$ 70, and is depicted as being substantially shorter in duration relative to the benchmark coastdown time $t_B$ 72 established at the time of data storage system 20 manufacture. The difference 71 between the nominal benchmark coastdown time $t_B$ 72 and the degraded in-service coastdown time $t_S$ 70 is a general measure of the magnitude of spindle motor 26 performance degradation. An in-service coastdown time $t_S$ being substantially equivalent to the benchmark coastdown time $t_B$ 72 is generally indicative of a spindle motor 26 experiencing little or no performance degradation relative to its performance characteristics determined upon initial usage. It is further noted that a correction factor may be applied when determining the in-service coastdown time $t_S$ 70 when the operating temperature of the data storage system 20 at the time of performing the in-service coastdown time determination procedure is different from the operating temperature when the benchmark coastdown time $t_B$ 72 was established. The correction factor preferably accounts for normal changes in spindle bearing assembly performance as a function of operating temperature, and generally improves the accuracy of the in-service coastdown time determination.

In another embodiment, a novel predictive failure analysis method and apparatus is preferably employed to determine the spin-up time (SUT) of the spindle motor 26 at the time of data storage system 20 manufacture and at various times throughout the service life of the spindle motor 26. The spin-up time refers to a duration of time required for the spindle motor 26 to transition between an initial angular velocity $\omega_I$ and a relatively higher test angular velocity $\omega_T$, preferably the nominal design velocity $\omega_N$ of the spindle motor 26. An increase in the spin-up time may also be indicative of performance degradation in the spindle motor assembly 26.

Figure 4:
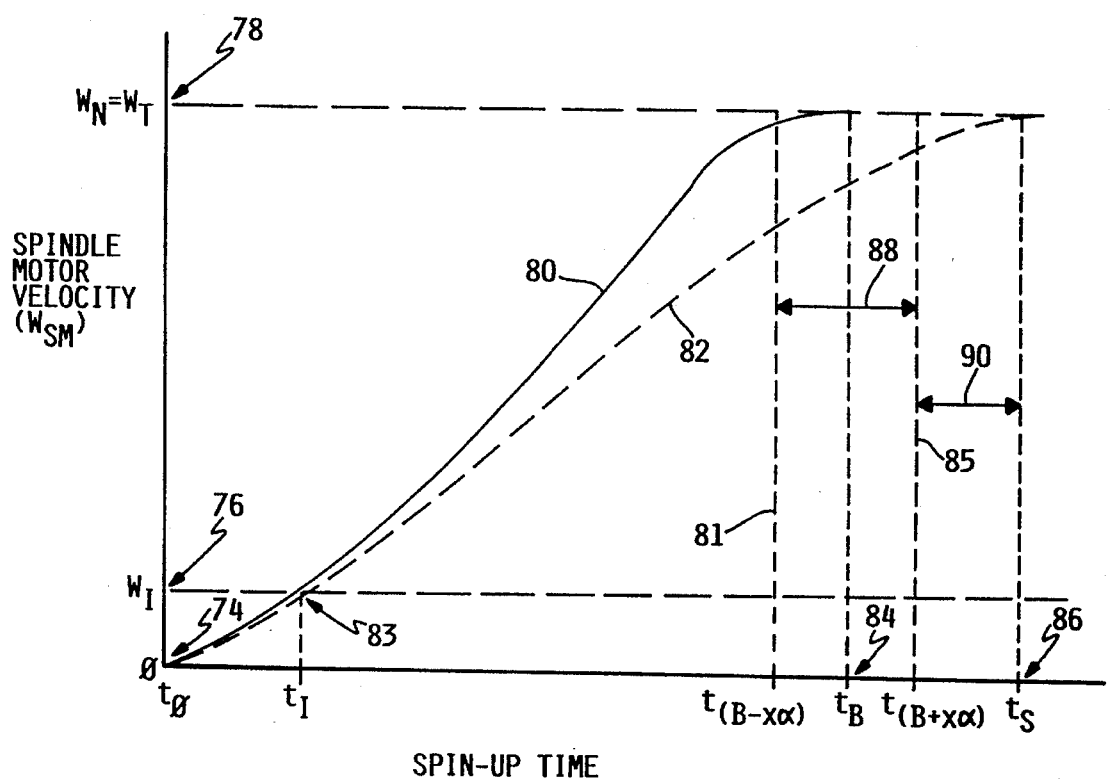
FIG. 4 is a generalized graph depicting typical spin-up time curves for a spindle motor operating under nominal conditions and degraded conditions.

In FIG. 4, there is illustrated a generalized graph depicting the characteristic spin-up time curves 80 and 82 for a spindle motor 26 tested at the time of data storage system 20 manufacture and at a later time during the service life of the spindle motor 26. The spin-up time curve 80 is generally representative of the acceleration profile for the spindle motor 26 transitioning from an initial angular velocity $\omega_I$ 76 to a higher test angular velocity $\omega_T$ 78. The initial velocity $\omega_I$ of the spindle motor 26 under test may be selected as zero velocity or a velocity significantly lower than the test velocity $\omega_T$ 78. During the service life of the spindle motor 26, a number of spin-up time determinations are preferably performed to determine the existence and magnitude of spin-up time deviations with respect to a nominal benchmark spin-up time $t_B$ 84 determined at or near the time of data storage system 20 manufacture. The magnitude of the time deviation 90 between the benchmark spin-up time $t_B$ 84 and in-service spin-up time $t_S$ 86 is generally reflective of degraded spindle motor 26 performance.

Figure 5:
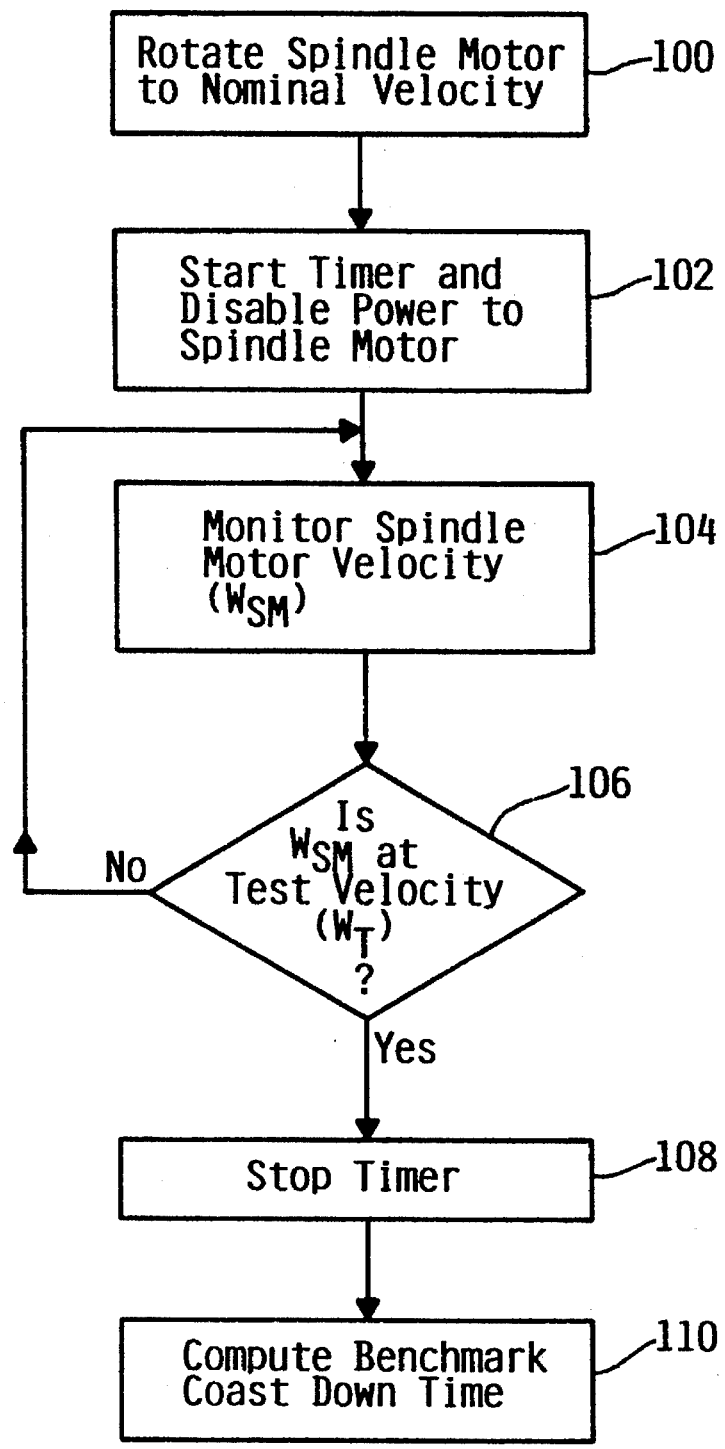
FIG. 5 is a flow chart describing a method for determining a characteristic coastdown time for a spindle motor at the time of manufacture in accordance with a novel spindle motor predictive failure analysis procedure.
Figure 6:
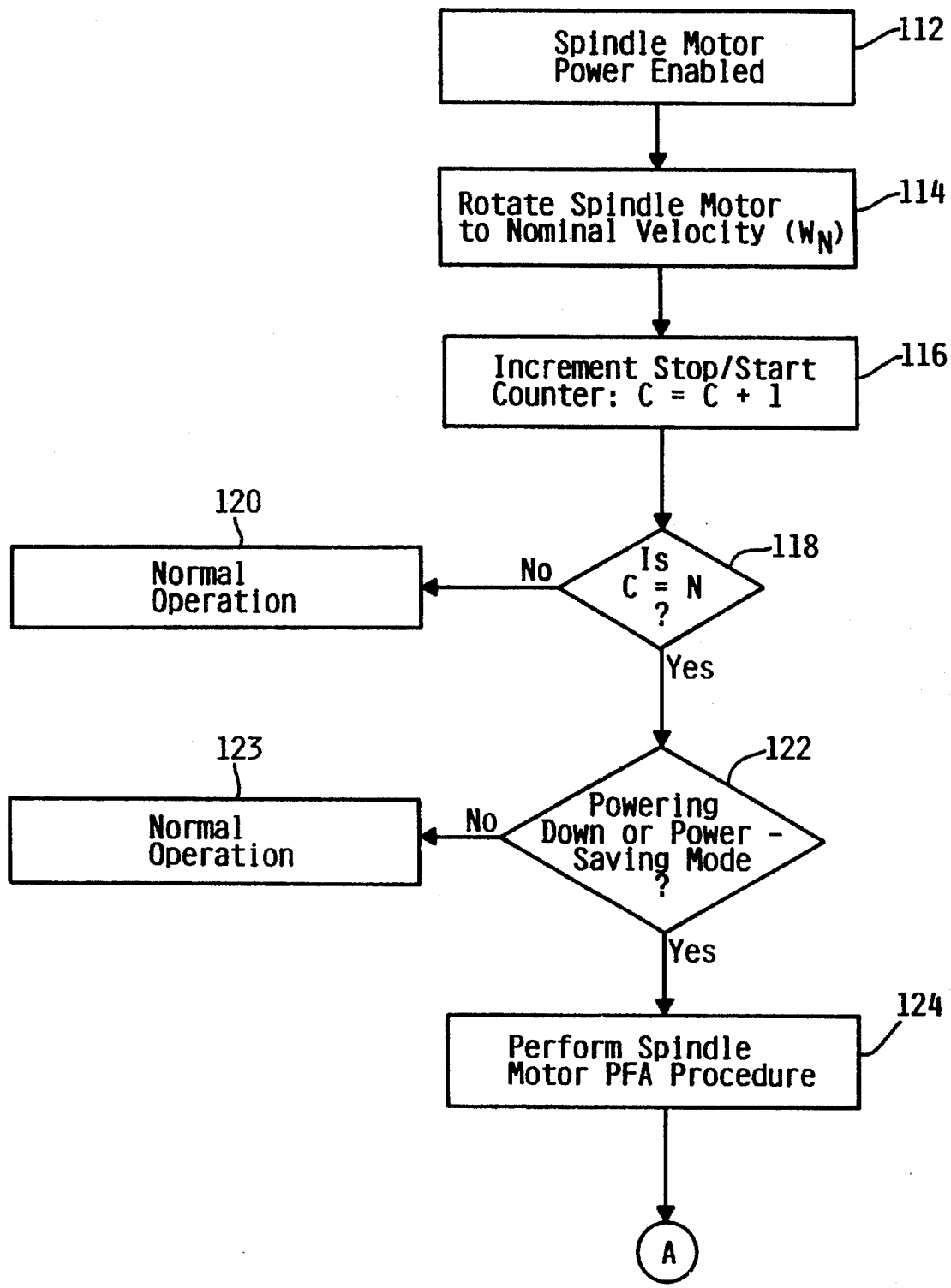
FIG. 6 is a flow chart describing a method for detecting degradation in spindle motor performance in accordance with a novel spindle motor predictive failure analysis procedure.
Figure 7:
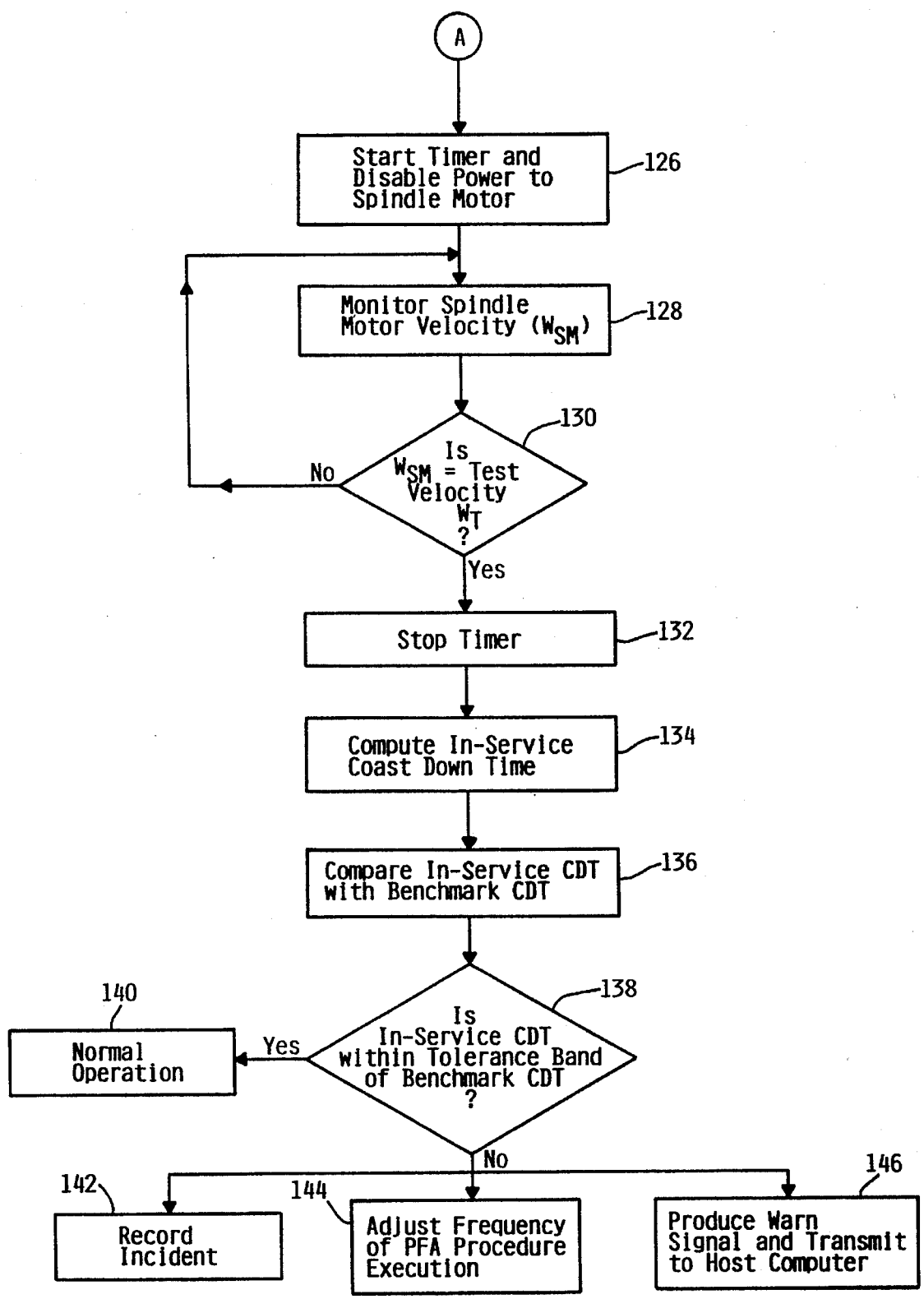
FIG. 7 is a continuation of a flow chart describing a method for detecting degradation in spindle motor performance in accordance with a novel spindle motor predictive failure analysis procedure.

A preferred method for detecting spindle motor 26 performance degradation using spindle motor coastdown time as a performance test parameter is illustrated in the flow charts provided in FIGS. 5–7. Establishing a nominal benchmark coastdown time $t_B$ for a particular spindle motor 26 is initially determined during or shortly after the time of data storage system 20 manufacture. The spindle motor 26 is preferably rotated to its nominal design speed $\omega_N$ at step 100 for a period of time sufficient to allow the data storage system 20 to achieve a steady-state operating temperature. The novel spindle motor predictive failure analysis procedure is then initiated at step 102 by starting a timer while simultaneously removing power from the spindle motor 26. It is considered advantageous to allow the spindle motor 26 to decelerate without assistance from a breaking mechanism. Such breaking would tend to mask any subtle deceleration factors that would otherwise indicate a degraded spindle bearing condition.

At step 104, the deceleration of the spindle motor 26 is monitored and the velocity $\omega_{SM}$ is sampled at various times during spindle motor 26 deceleration. The sampled spindle motor velocity $\omega_{SM}$ is compared to a predetermined test velocity $\omega_T$, at step 106, which is preferably a significantly lower velocity relative to the initial spindle motor 26 velocity $\omega_I$. Spindle motor 26 deceleration is monitored until the spindle motor 26 velocity $\omega_{SM}$ is substantially equivalent to the predetermined test velocity $\omega_T$, at which point the timer is stopped at step 108. The coastdown time $t_B$ for the spindle motor 26 is then computed at step 110 as the elapsed time between steps 102 and 108 indicated as the total time recorded by the timer. This coastdown time $t_B$ is later used as a benchmark for assessing the operating condition of the spindle motor 26 during its service life. The benchmark coastdown time $t_B$ is preferably representative of an average coastdown time $t_B$ determined after repeating method steps 100 through 110 a number of times.

It is noted that a number of known means may be employed to determine whether the spindle motor 26 has decelerated to the predetermined test velocity $\omega_T$ at step 106.

The test velocity $\omega_T$ is preferably selected to be significantly lower than the initial spindle motor 26 velocity $\omega_I$, and is typically limited by the accuracy and resolution of the specific velocity and time measuring apparatus of a particular data storage system 20. The back-EMF of the spindle motor 26, for example, may be used when determining whether the predetermined test velocity $\omega_T$ has been reached. The test velocity $\omega_T$ is preferably selected so that the back-EMF voltage at the test velocity $\omega_T$ can be easily distinguished from background noise. A data storage system 20 that employs Hall-type sensors to determine spindle motor 26 velocity, for example, can generally resolve a lower test velocity $\omega_T$ than a system 20 that utilizes back-EMF for similar velocity determinations.

During the service life of the spindle motor 26, a coastdown time determination procedure similar to that described with reference to FIG. 5 is preferably performed in the field and on a routine basis in accordance with the flow charts illustrated in FIGS. 6–7. A significant advantage of the novel spindle motor predictive failure analysis procedure concerns the execution of the procedure during the normal power-down sequence or power-saving routine performed by the data storage system 20. In one embodiment, the novel coastdown time determination procedure is preferably performed during the normal power-down sequence of the system 20, thereby having little or no impact on the normal operation of the data storage system 20. In another embodiment, the novel coastdown time determination procedure is preferably performed during a power-saving routine executed by the system 20. During periods of extended non-utilization, some data storage systems employ control hardware and software to temporarily disable the delivery of current supplied to the spindle motor 26, typically after the transducers 27 have been moved to a parked position or unloaded to a parking ramp 60, in an effort to conserve system power. The novel spindle motor predictive failure analysis procedure is preferably executed during this power-saving mode, thus having no appreciable affect on the normal operation of the data storage system 20.

Early in the service life of the spindle motor 26, the coastdown time determination procedure is preferably performed on a relatively infrequent basis, such as every 500 or 1,000 start/stop sequences, for example. As the spindle motor 26 ages, the frequency of in-service coastdown time determinations preferably increases, such as to every 50 or 100 start/stop sequences. In one embodiment, the frequency of coastdown time determinations is dynamically determined by the data storage system 20 and altered in response to the magnitude of change between the in-service coastdown time $t_S$ and the predetermined benchmark coastdown time $t_B$. For example, an acceptable deviation of the in-service coastdown time $t_S$ with respect to the predetermined benchmark coastdown time $t_B$ may be one to three sigma from the mean, as represented in FIG. 3 by the tolerance band 73 defined by $t_{B-x\sigma}$ 75 and $t_{B+x\sigma}$ 77 bounding $t_B$ 72. A deviation on the order of five to six sigma from the mean, however, preferably results in a dynamic increase in the frequency of in-service coastdown time determinations. A testing frequency of 50 start/stop sequences, for example, may be increased to 10 start/stop sequences in response to a relatively large deviation between in-service and benchmark coastdown times $t_S$ and $t_B$.

With further reference to FIG. 6, the in-service spindle motor predictive failure analysis procedure is initiated at step 112, with power initially being supplied to the spindle motor 26. The spindle motor 26 is rotated, at step 114, to its nominal velocity $\omega_N$ for normal data storage system 20 operation. At step 116, a stop/start counter is incremented by one. The stop/start counter, preferably included as part of the controller 58 electronics of the data storage system 20, stores the cumulative number of stop/start sequences executed since the previously performed in-service coastdown time determination procedure. If, at step 118, the count C of the stop/start counter is not equal to the testing frequency count N, the coastdown time determination procedure is not performed, as at step 120. If, however, the count C of the stop/start counter is equal to the testing frequency count N, normal operation of the data storage system 20 is preferably uninterrupted, at step 123, until the system 20 executes a normal power-down sequence or power-saving routine at which time the novel spindle motor predictive failure analysis procedure is preferably performed, as at steps 122 and 124.

Referring now to FIG. 7, the novel in-service coastdown time determination procedure is initiated at step 126 by starting a timer and simultaneously disabling power to the spindle motor 26. As discussed previously, the spindle motor 26 is preferably allowed to decelerate without influence from a braking apparatus. During the period of spindle motor 26 deceleration, velocity determinations are performed at step 128. At step 130, the velocity of the spindle motor $\omega_{SM}$ is compared to the test velocity $\omega_T$, and if unequal, monitoring of the spindle motor velocity $\omega_{SM}$ is continued at step 128. If the spindle motor velocity is equivalent to the test velocity $\omega_T$, the timer is stopped at step 132. The in-service coastdown time $t_S$ for the spindle motor 26 is computed at step 134 as the total elapsed time recorded by the timer. The computed in-service coastdown time $t_S$ is then compared with the predetermined benchmark coastdown time $t_B$ at step 136. It is noted that the predetermined benchmark coastdown time $t_B$ parameter is preferably stored in a memory device included within the electronics of the controller 58 at the time of data storage system 20 manufacture. Also preferably stored in memory are the test velocity initial velocity $\omega_I$, benchmark coastdown time $t_B$, and tolerance band parameters, for example.

In practice, is may be desirable to establish a tolerance range within which a computed in-service spindle motor coastdown time $t_S$ may be considered acceptable and generally indicative of inconsequential changes in spindle motor 26 performance. At step 138, the computed in-service coastdown time $t_S$ is tested to determine whether it falls within the tolerance band 73 illustrated in FIG. 3. If the computed in-service coastdown time $t_S$ falls within this tolerance band 73, normal operation of the data storage system is continued at step 140. It is noted that resuming normal operation of the system 20 at step 140 may, for example, involve continuing the power-down sequence or the power-saving routine of the data storage system 20. Depending on the magnitude of the deviation between the computed in-service coastdown time $t_S$ and the predetermined benchmark coastdown time $t_B$, different system responses are preferably implemented. A slight deviation between the computed coastdown time $t_S$ and the predetermined benchmark coastdown $t_B$ may warrant only a minimal system 20 response, such as recording the out-of-tolerance incident at step 142. Recording of the out-of-tolerance incident may include incrementing a counter or bit status register within the controller 58 electronics dedicated to monitoring data storage system 20 faults. A larger deviation may warrant a more drastic system 20 response, such as adjustment of the testing frequency for performing the in-service spindle motor predictive failure analysis procedure, as at step 144. A dramatic deviation between the computed in-service coastdown time $t_S$ and the predetermined benchmark coastdown $t_B$ may, for example, cause the data storage system 20 to produce a warn signal which is transmitted to a host computer to which the data storage system is coupled, as at step 146. The warn signal preferably alerts a user that timely repair or replacement of the data storage system 20 is required.

It is noted that large deviations between the in-service coastdown time $t_S$ and the predetermined benchmark coastdown time $t_B$ is often indicative of imminent spindle motor bearing failure. Moderate to large deviations may also be indicative of data storage system 20 failure mechanisms not attributable to bearing failure or excessive wear of the bearing assembly. A significant advantage of the novel spindle motor predictive failure analysis procedure concerns the ability to detect other internal data storage system 20 failure modes that affect spindle motor performance but are not detectable using conventional predictive failure analysis methodologies. For example, interference of spindle motor 26 or disk 24 rotation by a displaced or dislodged component within the housing 21 of the data storage system 20 can adversely affect the performance of the spindle motor 26. A loose or dislodged internal particle filter, for example, may contact a surface of the disk 24 or hub 27 of the spindle motor 26. Although in some instances such contact may not induce catastrophic data storage system 20 failure, the additional resulting friction may ultimately damage a read/write transducer 27, the sensitive surface of a data storage disk 24, or cause the spindle motor 26 to consume excessive amounts of supply current. Execution of the novel coastdown time determination procedure will detect a significant change in the coastdown time of the spindle motor 26, thereby indicating a substantial degradation in spindle motor 26 performance. Direct contact between an internal component and either the data storage disk 24 or spindle motor 26 is preferably indicated by the production of a warn signal which, when transmitted to a host computer, alerts the user to the severe anomalous condition of the data storage system 20.

Another internal data storage system 20 failure mechanism that can significantly impact spindle motor 26 performance is associated with one or more read/write transducer 27 and slider body 35 assemblies experiencing significant increases in take-off velocity. Such an increase in take-off velocity is generally indicative of intermittent or imminent contact between the transducer 27/slider body 35 assembly and the disk surface 24. Such deleterious contact can significantly reduce the in-service coastdown time $t_S$ of the spindle motor 26. It is noted that the novel spindle motor predictive failure analysis procedure may be employed in combination with other, and typically more sophisticated, failure analysis procedures. For example, various known methods for determining changes in transducer 27/slider body 35 assembly flying characteristics using data or servo channel measurements are often employed to measure changes in the flying height of the assembly. Employing these and other known sophisticated predictive failure analysis procedures in combination with the relatively simple yet elegant novel coastdown time determination procedure can provide efficient detection and accurate isolation of a particular data storage system 20 failure mechanism.

Figure 8:
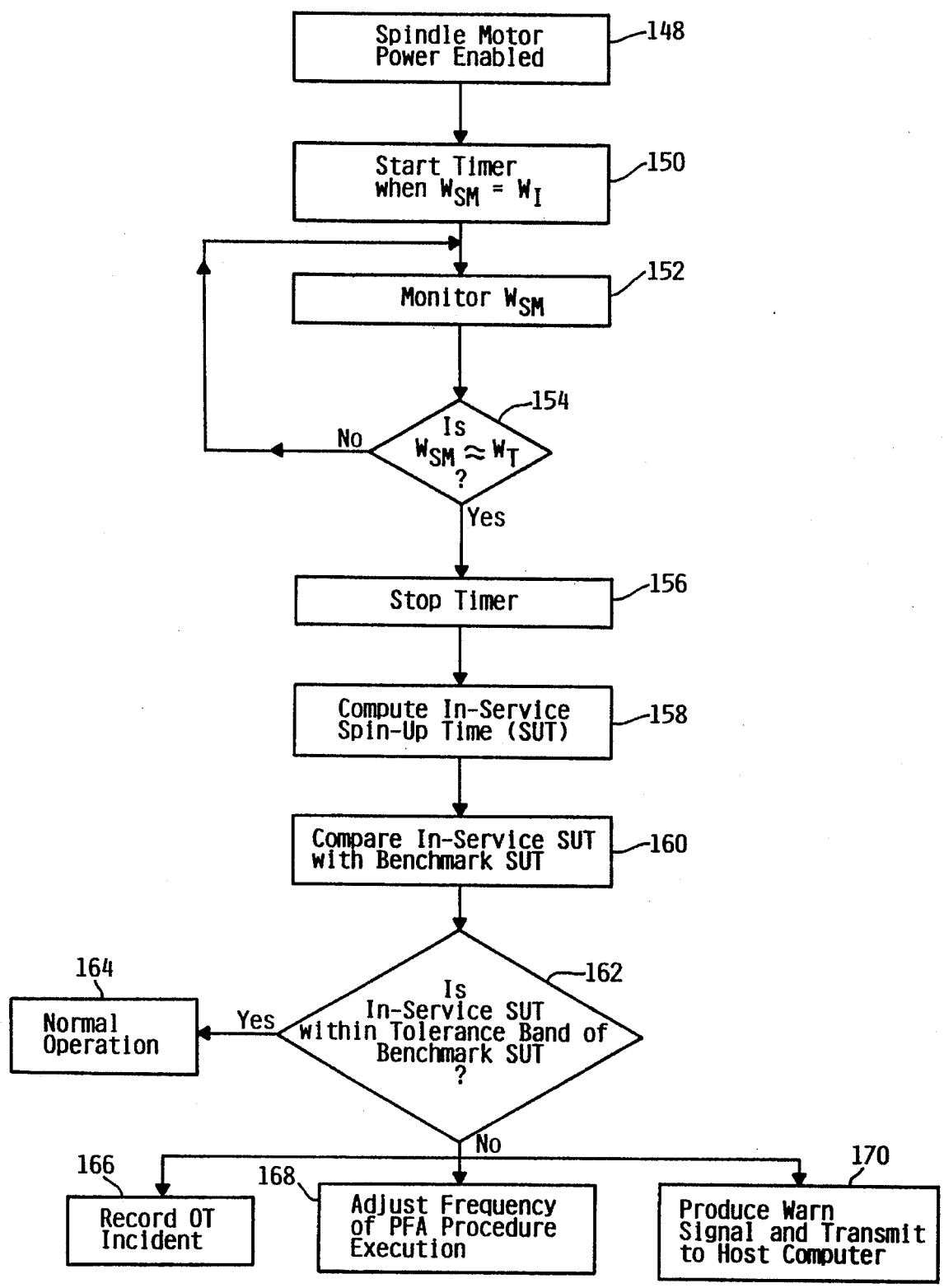
FIG. 8 is a flow chart describing an alternative method for detecting degradation in spindle motor performance in accordance with a novel spindle motor predictive failure analysis procedure.

Turning now to FIG. 8, there is illustrated in flow diagram form the method steps for employing a novel spindle motor predictive failure analysis procedure in accordance with an alternative embodiment as discussed previously with reference to FIG. 4. Rather than determine spindle motor performance degradation as a function of coastdown time, the start-up time for the spindle motor 26 to transition between an initially low velocity $\omega_I$ and a relatively high test velocity $\omega_T$ is determined. The test velocity $\omega_T$ is preferably the nominal design velocity $\omega_N$ of the spindle motor 26, while the initial velocity $\omega_I$ is preferably a spindle motor 26 velocity significantly lower than the test velocity $\omega_T$, such as zero velocity.

Still referring to FIG. 8, the in-service start-up time determination procedure is initiated at step 148 by enabling power delivery to the spindle motor 26. A timer is started at step 150 when the spindle motor velocity $\omega_{SM}$ is equivalent to the predetermined initial velocity $\omega_I$. During spindle motor 26 acceleration, the spindle motor 26 velocity $\omega_{SW}$ is monitored and computed at step 152, and compared to the test velocity $\omega_T$ at step 154. When the spindle motor velocity $\omega_{SM}$ is substantially equivalent to the test velocity $\omega_T$, the timer is stopped at step 156. The in-service spin-up time $t_S$ is then computed at step 158, which is equivalent to the time recorded by the timer at step 156. The computed in-service spin-up time $t_S$, at step 160, is then compared with a predetermined benchmark spin-up time $t_B$ of the spindle motor 26 previously established during manufacture of the data storage system 20. If, at step 162, the computed in-service start-up time $t_S$ falls within a tolerance band 88 bounding the predetermined benchmark start-up time $t_S$, illustrated as the band defined between $t_{B-x d\sigma}$ 81 and $t_{B-x\sigma}$ 85 in FIG. 4, normal operation of the data storage system 20 continues at step 164. If the computed in-service start-up time $t_S$ falls beyond the bounds of the tolerance band 88, the data storage system 20 preferably responds in accordance with the relative magnitude of the spin-up time deviation by, for example, recording the out-of-tolerance incident at step 166, adjusting the testing frequency of the in-service start-up time determination procedure at step 168, or producing a warn signal and transmitting the warn signal to a host computer coupled to the data storage system 20 at step 170.

The electronics of the controller 58 generally includes a microprocessor or other processing circuitry suitable for storing and executing the novel spindle motor predictive failure analysis procedure. The timer used to determine the coastdown time and start-up time may be implemented in hardware or software. Moreover, the microcode executed by the controller 58 to orchestrate the normal operations of the data storage system 20 may include code representative of a sub-routine for performing the novel spindle motor predictive failure analysis procedure, which is preferably executed during the normal power-down sequence or power-saving routine of the data storage system 20. As such, no additional hardware and only a minor modification to existing software is required to fully implement the novel spindle motor predictive failure analysis method and apparatus.

It will, of course, be understood that various modifications and additions can be made to the embodiments discussed hereinabove without departing from the scope or spirit of the present invention. For example, the frequency for performing the coastdown time or start-up time determination procedure may be set to increments other than those discussed above, and the procedure may be performed at times other than during the normal power-down sequence or power-saving routine of the data storage system 20. Moreover, it should be understood that in determining the coastdown or start-up time, measurements other than the elapsed time may be employed, such as measurements associated with spindle motor 26 velocity as a function of time, spindle motor 26 acceleration or deceleration as a function of time, or the number of spindle motor 26 revolutions over a predetermined period of time, for example. Accordingly, the scope of the present invention should not be limited to the particular embodiments discussed above, but should be defined only by the claims set forth below and equivalents of the disclosed embodiments.

What is claimed is:

1. A method of detecting degradation in the performance of a data storage device having a data storage disk for storing data mounted to a spindle motor for rotating the data storage disk, a transducer for transferring data to and from the disk, an actuator for moving the transducer across the disk, and a controller for coordinating the transfer of data to and from the disk, the performance degradation detection method comprising the steps of:

rotating the spindle motor at an initial velocity;

rotating the spindle motor at a test velocity;

computing a duration of time for the spindle motor to transition between the initial velocity and test velocity; and comparing the computed transition time with a predetermined transition time;

wherein a degradation in spindle motor performance is indicated by a deviation between the computed transition time and the predetermined transition time.

2. A method as claimed in claim 1, wherein the initial velocity of the spindle motor is the nominal operating velocity of the spindle motor, and the test velocity of the spindle motor is a spindle motor velocity lower than the nominal operating velocity.

3. A method as claimed in claim 1, wherein the test velocity of the spindle motor is the nominal operating velocity of the spindle motor, and the initial velocity of the spindle motor is a spindle motor velocity lower than the test velocity.

4. A method as claimed in claim 1, further including the step of storing the predetermined transition time.

5. A method as claimed in claim 1, wherein the step of comparing the computed transition time with the predetermined transition time includes the step of retrieving the predetermined transition time.

6. A method as claimed in claim 1, wherein the step of rotating the spindle motor at the initial velocity includes the step of removing power from the spindle motor.

7. A method as claimed in claim 1, wherein the predetermined transition time is computed by a method including the steps of:

rotating the spindle motor at the initial velocity;

rotating the spindle motor at the test velocity; and computing the predetermined transition time as a duration of time for the spindle motor to transition between the initial velocity and the test velocity.

8. A method as claimed in claim 1, wherein the step of comparing the computed transition time with the predetermined transition time includes the further steps of:

computing a time deviation between the computed transition time and the predetermined transition time; and producing a warn signal in response to the computed time deviation being greater than a predetermined time deviation.

9. A method as claimed in claim 1, wherein the performance degradation detection method is performed periodically during the service life of the spindle motor.

10. A method as claimed in claim 9, wherein the frequency for performing the performance degradation detection method is adjusted in response to the magnitude of the deviation between the computed transition time and the predetermined transition time.

11. A method of detecting degradation in the performance of a data storage device having a data storage disk for storing data mounted to a spindle motor for rotating the data storage disk, a transducer for transferring data to and from the disk, an actuator for moving the transducer across the disk, and a controller for coordinating the transfer of data to and from the disk, the performance degradation detection method comprising the steps of:

rotating the spindle motor at an initial velocity;

initiating a timer at a starting time associated with removing power from the spindle motor;

terminating the timer at an ending time associated with the spindle motor attaining a test velocity;

computing a coastdown time of the spindle motor as an elapsed time between the ending time and starting time; and comparing the computed coastdown time of the spindle motor with a predetermined coastdown time;

wherein a degradation in spindle motor performance is indicated by the computed coastdown time being shorter in duration relative to the predetermined coastdown time.

12. A method as claimed in claim 11, wherein the initial velocity of the spindle motor is the nominal operating velocity of the spindle motor, and the test velocity of the spindle motor is a spindle motor velocity lower than the nominal operating velocity of the spindle motor.

13. A method as claimed in claim 11, further including the step of storing the predetermined coastdown time.

14. A method as claimed in claim 11, wherein the step of comparing the computed coastdown time of the spindle motor with the predetermined coastdown time includes the step of retrieving the predetermined coastdown time stored in the data storage device.

15. A method as claimed in claim 11, wherein the predetermined coastdown time is computed by a method including the steps of:

rotating the spindle motor at the initial velocity;

initiating a timer at a starting time associated with removing power from to the spindle motor;

terminating the timer at an ending time associated with the spindle motor attaining the test velocity; and computing the predetermined coastdown time of the spindle motor as a time duration between the ending time and the starting time.

16. A method as claimed in claim 11, wherein the step of comparing the computed coastdown time with the predetermined coastdown time includes the further steps of:

computing a time deviation between the computed coastdown time and the predetermined coastdown time; and producing a warn signal in response to the computed time deviation being greater than a predetermined time deviation.

17. A system for storing data comprising:

a housing;

a data storage disk;

a spindle motor mounted to the housing and adapted for rotating the data storage disk;

an actuator movably mounted to the housing;

a transducer mounted to the actuator; and a spindle motor degradation detection circuit including:

computing means for determining the transition time of the spindle motor to transition between an initial spindle motor velocity and a test spindle motor velocity; and comparing means for comparing the transition time of the spindle motor to a predetermined transition time;

wherein a degradation in spindle motor performance is indicated by a deviation between the transition time of the spindle motor and the predetermined transition time.

18. A system as claimed in claim 17, wherein the computing means of the spindle motor degradation detection circuit comprises detection means for detecting the initial spindle motor velocity and the test spindle motor velocity.

19. A system as claimed in claim 17, wherein the computing means comprises a timer.

20. A system as claimed in claim 17, wherein:

the comparing means comprises a microprocessor coupled to memory; and the predetermined transition time is stored in the memory.

* * * * *